(12) United States Patent
Khalid (10) Patent No.: US 9,759,132 B2
(45) Date of Patent: Sep. 12, 2017

(54) GAS TURBINE ENGINE PERFORMANCE SEEKING CONTROL

(71) Applicant: Rolls-Royce Corporation

(72) Inventor: Syed Jalaluddin Khalid, Palm Beach Gardens, FL (US)

(73) Assignee: Rolls-Royce Corporation, Indianapolis, IN (US)

( * ) Notice: Subject to any disclaimer, the term of this patent is extended or adjusted under 35 U.S.C. 154(b) by 531 days.

(21) Appl. No.: 14/460,534

(22) Filed: Aug. 15, 2014

(65) Prior Publication Data

US 2015/0267619 A1 Sep. 24, 2015

Related U.S. Application Data

(63) Continuation of application No. PCT/US2013/026424, filed on Feb. 15, 2013.

(60) Provisional application No. 61/599,061, filed on Feb. 15, 2012.

(51) Int. Cl.
  *F02C 9/00* (2006.01)
  *B64C 11/30* (2006.01)

(52) U.S. Cl.
  CPC .............. *F02C 9/00* (2013.01); *B64C 11/305* (2013.01); *F05D 2270/20* (2013.01); *F05D 2270/71* (2013.01)

(58) Field of Classification Search
  CPC ................... F02C 9/00; B64C 11/305
  See application file for complete search history.

(56) References Cited

U.S. PATENT DOCUMENTS

| | | | |
|---|---|---|---|
| 4,947,334 A | 8/1990 | Massey et al. | |
| 5,023,793 A | 6/1991 | Schneider et al. | |
| 5,078,345 A | 1/1992 | De Vries et al. | |
| 5,105,372 A | 4/1992 | Provost et al. | |
| 5,189,620 A | 2/1993 | Parsons et al. | |
| 5,305,595 A | 4/1994 | Curran et al. | |
| 5,315,819 A | 5/1994 | Page et al. | |
| 6,729,139 B2 | 5/2004 | Desai et al. | |
| 6,748,744 B2 | 6/2004 | Peplow et al. | |
| 6,789,390 B2 | 9/2004 | Hu et al. | |
| 6,823,675 B2 | 11/2004 | Brunell et al. | |
| 6,986,641 B1 | 1/2006 | Desai et al. | |
| 7,530,232 B2 | 5/2009 | Certain | |
| 7,742,904 B2 * | 6/2010 | Healy | G05B 17/02 700/287 |

(Continued)

OTHER PUBLICATIONS

International Search Report and Written Opinion, PCT/US2013/026424, Rolls-Royce Corporation, Apr. 24, 2013.

(Continued)

*Primary Examiner* — Thomas G Black
*Assistant Examiner* — Peter D Nolan
(74) *Attorney, Agent, or Firm* — Shumaker & Sieffert, P.A.

(57) ABSTRACT

A gas turbine engine control system is disclosed having a model and an observer that together can be used to adjust a command issued to the gas turbine engine or associated equipment to improve performance. In one form the control system includes a nominal model that is adjusted to real time conditions. The adjusted model is used with a Kalman filter and is ultimately used to determine a perturbation to a control signal. In one form the perturbation can be to a legacy controller.

16 Claims, 4 Drawing Sheets

(56) References Cited

U.S. PATENT DOCUMENTS

| | | | |
|---|---|---|---|
| 8,566,000 B2* | 10/2013 | Lickfold | F02C 9/32 |
| | | | 415/15 |
| 9,342,060 B2 | 5/2016 | Fuller et al. | |
| 2002/0162317 A1* | 11/2002 | Banaszuk | F23N 5/16 |
| | | | 60/204 |
| 2003/0200069 A1 | 10/2003 | Volponi | |
| 2005/0193739 A1* | 9/2005 | Brunell | G05B 13/048 |
| | | | 60/772 |
| 2007/0073525 A1 | 3/2007 | Healy et al. | |
| 2008/0060341 A1 | 3/2008 | Loisy | |
| 2008/0294305 A1 | 11/2008 | Roesch | |
| 2009/0090817 A1* | 4/2009 | Monka | F02K 1/1223 |
| | | | 244/76 R |
| 2010/0057297 A1 | 3/2010 | Itagaki et al. | |
| 2010/0153025 A1 | 6/2010 | Ling et al. | |
| 2010/0162718 A1* | 7/2010 | Bowman | F02C 9/28 |
| | | | 60/773 |
| 2010/0241331 A1* | 9/2010 | Duke | F01D 25/18 |
| | | | 701/100 |
| 2011/0213507 A1* | 9/2011 | Dooley | F01D 15/10 |
| | | | 700/287 |
| 2012/0022838 A1 | 1/2012 | Bacic et al. | |
| 2015/0007574 A1 | 1/2015 | Morgan et al. | |

OTHER PUBLICATIONS

O'Brien et al., Performance Prediction and Simulation of Gas Turbine Engine Operation, Report of the RTO Applied Vehicle Technology Panel (AVT) Task Group, AVT-018, RTO Technical Report 44, 2002 [retrieved from http://ftp.rta.nato.int/public/PubFullText/RTO/TR/RTO-TR-044/TR-044-$$ALL.pdf] (pp. 1, 5-107).

Behbahani et al., "Integrated Model-Based Controls and PHM for Improving Turbine Engine Performance, Reliability, and Cost", 45th AIAA/ASME/SAE/ASEE Joint Propulsion Conference & Exhibit, Aug. 2-5, 2009, 9 pgs.

Panov, "Model-Based Control and Diagnostic Techniques for Operational Improvements of Gas Turbine Engines", Proceedings of 10th European Conference on Turbomachinery Fluid dynamics & Thermodynamics, Apr. 15-19, 2013, 12 pgs.

U.S. Appl. No. 15/336,534, by Robert J. Zeller, filed Oct. 27, 2016.

Office Action from counterpart European Application No. 13748692.4, dated Oct. 17, 2016, 2 pp.

Extended Search Report from counterpart European Application No. 13748692.4, dated Feb. 15, 2017, 7 pp.

\* cited by examiner

GAS TURBINE ENGINE PERFORMANCE SEEKING CONTROL

CROSS REFERENCE TO RELATED APPLICATIONS

The present application is a continuation of PCT Application No. PCT/US2013/026424, filed Feb. 15, 2013, which claims the benefit of U.S. Provisional Patent Application 61/599,061, filed Feb. 12, 2012, each of which are incorporated herein by reference.

TECHNICAL FIELD

The present invention generally relates to gas turbine engine control systems, and more particularly, but not exclusively, to gas turbine engine optimized controllers.

BACKGROUND

Providing an ability to adjust performance of a gas turbine engine remains an area of interest. Some existing systems have various shortcomings relative to certain applications. Accordingly, there remains a need for further contributions in this area of technology.

SUMMARY

One embodiment of the present invention is a unique gas turbine engine controller. Other embodiments include apparatuses, systems, devices, hardware, methods, and combinations for controlling a gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
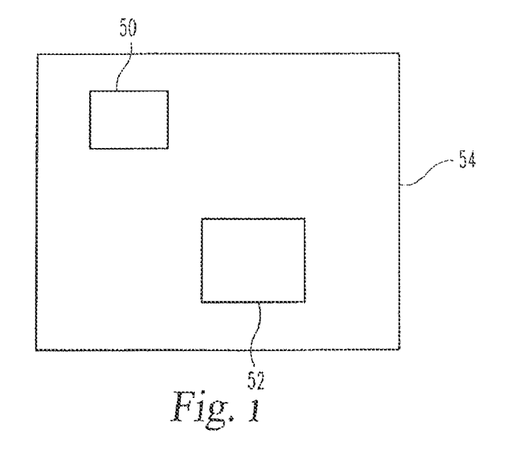
FIG. 1 depicts an embodiment of a vehicle and engine.

With reference to FIG. 1, there is illustrated a schematic representation of a system 50 useful to control one or more aspects of an engine 52, a vehicle 54, or an integrated engine 52/vehicle 54. In various forms described further below the engine 52 can be coupled to provide a motive force to a vehicle, such as an aircraft, in which the system 50 is used to improve and/or optimize performance. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The engine 52 can be an internal combustion engine, and in one non-limiting embodiment the engine 52 is a gas turbine engine. The gas turbine engine 52, furthermore, can take a variety of forms such as, but not limited to, a turboprop engine and a turbofan engine. A discussion of one embodiment of the gas turbine engine 52 in the form of a turboprop engine follows immediately below.

Figure 2:
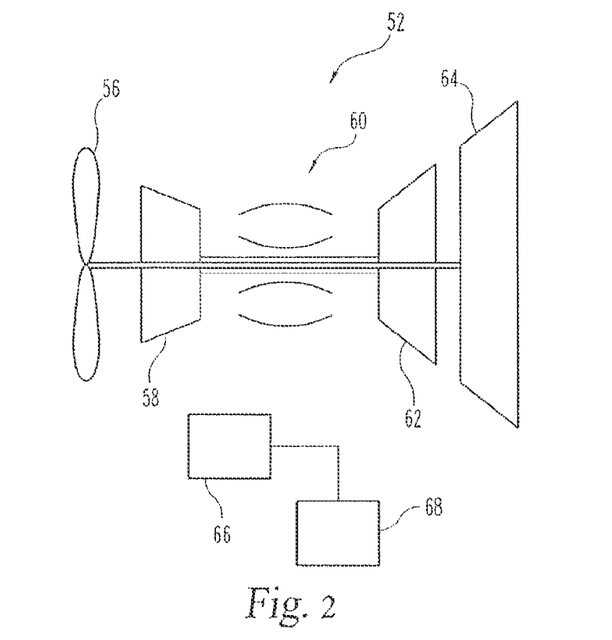
FIG. 2 depicts an embodiment of a gas turbine engine.

Turning now to FIG. 2, one embodiment of the gas turbine engine 52 is depicted as a turboprop engine. The engine 52 in the illustrated embodiment includes a propeller 56, compressor 58, combustor 60, turbine 62, and power turbine 64. Though the engine 52 is shown having separate shafts, any number of shafts can be used in other embodiments. The aircraft engine 52 operates by receiving and compressing a working fluid, such as air, in the compressor 58 prior to mixing the working fluid with fuel and combusting the mixture in the combustor 60. The fuel can be provided by a fuel nozzle and in which a rate of fuel flow can be controlled through pumping techniques, fuel metering techniques, etc. The products of combustion are expanded in the turbine 62 to extract work and power the compressor 58. The products of combustion are also expanded in the power turbine 64 to drive the propeller 56.

The gas turbine engine 52 of the illustrated embodiment can also have any number of variations. For example, the propeller 56 can be a variable pitch propeller in which the blades of the propeller can be adjusted to a variety of angles to change propeller performance. Any variety of actuation systems and/or devices can be used to adjust the blade angles. In alternative and/or additional forms the gas turbine engine 52 can include variable vanes in one or more rows of the compressor 58. Such variable vanes can be actuated to a variety of positions in the compressor 58 to adjust a flow of working fluid in the compressor 58. The vanes can be actuated using a variety of techniques, such as but not limited to unison rings coupled to one or more actuators. Not all embodiments need include compressor variable geometry and/or variable pitch propeller. As will be appreciated, when the gas turbine engine 52 takes on different forms the engine 52 can also have any number of variations, whether including similar features such as variable compressor vanes or different features.

The aircraft 54 and/or the aircraft engine 52 can include provisions to measure, estimate, or otherwise assess various conditions such as speed, altitude, temperatures and pressures at various locations in the engine such as burner pressure and temperature, propeller pitch, fuel flow, compressor variable geometry, and spool speeds such as N1 and N2. These and other alternative and/or additional conditions can be measured, derived, estimated, etc. using any variety of techniques but that most, if not all, rely upon one or more sensors 66 to accomplish. For example, the sensor 66 can be used to measure a condition such as speed and altitude and can output any variety of data whether sensed or calculated. For example, the sensor 66 can sense and output conditions such as static temperature, static pressure, total temperature, and/or total pressure, among possible others. In addition, the sensor 66 can output calculated values such as, but not limited to, equivalent airspeed, altitude, and Mach number. Any number of other sensed conditions or calculated values can also be output. The sensor 66 provides data to a system, such as a controller 68, which can be accomplished using any variety of communications devices such as a bus, memory, direct electrical connection, radio-frequency communications, among potential others. The sensor can provide values in either analog or digital form.

The controller 68 is provided to monitor and control engine operations, aircraft operations, or integrated engine/aircraft operations, some of which have been mentioned above. The controller 68 can be comprised of digital circuitry, analog circuitry, or a hybrid combination of both of these types. Also, the controller 68 can be programmable, an integrated state machine, or a hybrid combination thereof. The controller 68 can include one or more Arithmetic Logic Units (ALUs), Central Processing Units (CPUs), memories, limiters, conditioners, filters, format converters, or the like which are not shown to preserve clarity. In one form, the controller 68 is of a programmable variety that executes algorithms and processes data in accordance with operating logic that is defined by programming instructions (such as software or firmware). Alternatively or additionally, operating logic for the controller 68 can be at least partially defined by hardwired logic or other hardware. In one particular form, the controller 68 is configured to operate as a Full Authority Digital Engine Control (FADEC); however, in other embodiments it may be organized/configured in a different manner as would occur to those skilled in the art. It should be appreciated that controller 68 can be exclusively dedicated to control of engine functions, or may further be used in the regulation/control/activation of one or more other subsystems or aspects of the aircraft 54.

Figure 3:
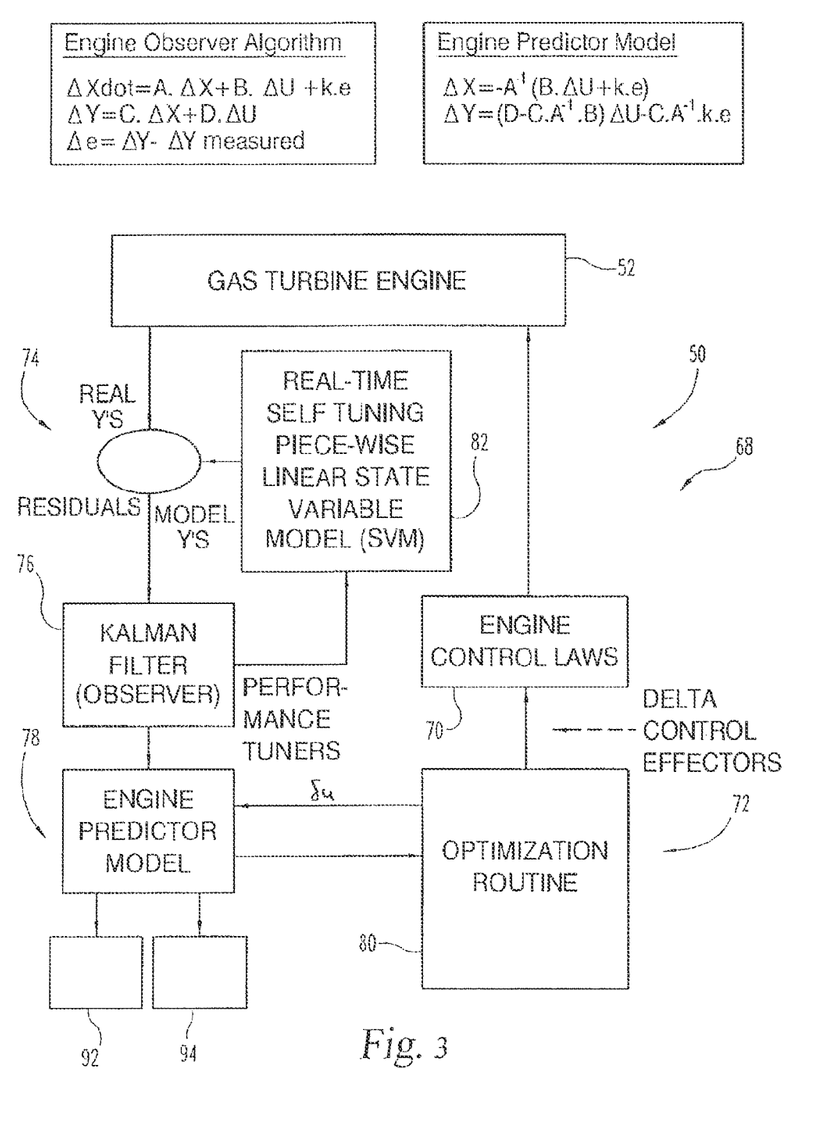
FIG. 3 depicts an embodiment of an engine controller.

Turning now to FIG. 3, a block diagram is depicted which includes a representation of the aircraft engine 52 and an engine controller 68 to manage engine operation. In one form the controller 68 is designed to provide a level of engine operability over the useful life of an engine, taking in to account engine wear, variability in performance due to tolerance stack-ups, etc. The control signal generated by the engine controller 68 can represent an optimized control value determined using techniques such as those described in various embodiments herein. To set forth an example that can relate to the embodiment of the engine 52 depicted in FIG. 2, the engine controller 68 can be useful to improve propeller thrust relative to a baseline, in some cases by maximizing propeller thrust. To set forth another additional and/or alternative form, the controller 68 can be useful in improving specific fuel consumption (SFC) relative to a baseline. Such improvements can be a minimum SFC. The command signals generated by the controller 68, therefore, can be used to affect operation of a number of engine related mechanisms such as fuel flow, propeller pitch setting, and compressor variable vanes, to set forth just a few examples of variable mechanisms.

The controller 68 can have a variety of forms and in the illustrated embodiment is shown in relation to a baseline controller 70 which can take the form of a nominal controller and/or a legacy controller, among potential others, and which also includes an offset controller 72. Legacy controllers can be those types of control systems that have been used in past operations of the engine 52 prior to the introduction of the offset controller 72. To set forth just one non-limiting example, the legacy controller can be a type of controller previously evaluated for flight safety and/or compliance related requirements by a governmental regulatory agency such as the Federal Aviation Administration. Whether or not a legacy controller, the engine control law 70 can take a variety of forms useful for controlling various aspects of the aircraft engine 52. The engine control law 70 can have any variety of architectures, include any number of linear and non-linear elements, and can incorporate any number of control methodologies such as classical linear control techniques, modern control techniques, and robust control techniques, to set forth just a few non-limiting examples.

The offset controller 72 of the illustrated embodiment is used to determine a control signal that is incorporated with a control signal from the baseline controller 70 that assists in improving engine operation relative to an operation using only the baseline controller 70. In one form shown below the offset controller 72 can be configured to generate an offset command that is summed with a command generated from the baseline controller 70. The offset controller 72 of the embodiment depicted in FIG. 3 includes a model 74 of the aircraft engine 50 that includes an observer 76 useful in updating the model based upon measured values, and an engine predictor model 78 coupled with an optimization module 80 that are useful in determining a suitable offset, such as an offset increment, to be incorporated with the engine controller 68.

The model 74 can take the form of a linear model that is determined for a current operation condition of the engine 52. In the illustrated form the model 74 includes a piecewise linear state-space model 82 built around a state space model as represented as follows:

$$\dot{X} = AX + BU$$

$$Y = CX + DU$$

The matrices A, B, C, and D can be determined using a variety of techniques from a variety of sources. For example, the matrices A, B, C, and D can be generated using an engine deck, a nonlinear engine performance simulation, etc, that has been configured to provide linearized representations of an engine operating point. The linearized representations can be formed using analytic and/or numerical techniques. To set forth just one non-limiting example, the linearized representations can be determined using bi-linear perturbation of a non-linear engine model. In one form the states of the linear model 74 are as follows:

$$X = [N_1 \ N_2 \ \Delta\eta_c \ \Delta\eta_{HPT} \ \Delta\eta_{PT} \ \Delta FC_{HPT} \ \Delta FC_{PT}]$$

where:

$N_1$ is power turbine speed $N_2$ is compressor speed $\Delta\eta_c$ is change in compressor efficiency $\Delta\eta_{HPT}$ is change in high pressure turbine efficiency $\Delta\eta_{PT}$ is change in power turbine efficiency $\Delta FC_{HPT}$ is change in high pressure turbine flow capacity $\Delta FC_{PT}$ is change in power turbine flow capacity The control vector can take the form:

$$U = [W_F \ CVG \ PP]$$

Where $W_F$ is fuel flow rate, CVG is compressor variable geometry, and PP is propeller pitch. The parameters of the state-space matrices are then represented as follows:

$$A = \begin{bmatrix} \frac{\partial \dot{N}_1}{\partial N_1} & \frac{\partial \dot{N}_1}{\partial N_2} & \frac{\partial \dot{N}_1}{\partial \Delta \eta_c} & \frac{\partial \dot{N}_1}{\partial \eta_{HPT}} & \cdots \\ \frac{\partial \dot{N}_2}{\partial N_1} & \frac{\partial \dot{N}_2}{\partial N_2} & \frac{\partial \dot{N}_2}{\partial \Delta \eta_c} & \frac{\partial \dot{N}_2}{\partial \eta_{HPT}} & \cdots \\ \frac{\partial \dot{\eta}_c}{\partial N_1} & \frac{\partial \dot{\eta}_c}{\partial N_2} & \frac{\partial \dot{\eta}_c}{\partial \Delta \eta_c} & \frac{\partial \dot{\eta}_c}{\partial \eta_{HPT}} & \cdots \\ \vdots & \vdots & \vdots & \vdots & \ddots \end{bmatrix}$$

$$B = \begin{bmatrix} \frac{\partial \dot{N}_1}{\partial w_f} & \frac{\partial \dot{N}_1}{\partial CVG} & \frac{\partial \dot{N}_1}{\partial PP} \\ \frac{\partial \dot{N}_2}{\partial w_f} & \frac{\partial \dot{N}_2}{\partial CVG} & \frac{\partial \dot{N}_2}{\partial PP} \\ \frac{\partial \dot{\eta}_c}{\partial w_f} & \frac{\partial \dot{\eta}_c}{\partial CVG} & \frac{\partial \dot{\eta}_c}{\partial PP} \\ \vdots & \vdots & \vdots \end{bmatrix}$$

$$C = \begin{bmatrix} \frac{\partial SHP}{\partial N_1} & \frac{\partial SHP}{\partial N_2} & \frac{\partial SHP}{\partial \Delta \eta_c} & \cdots \\ \frac{\partial P_b}{\partial N_1} & \frac{\partial P_b}{\partial N_2} & \frac{\partial P_b}{\partial \Delta \eta_c} & \cdots \\ \vdots & \vdots & \vdots & \ddots \end{bmatrix}$$

$$D = \begin{bmatrix} \frac{\partial SHP}{\partial w_f} & \frac{\partial SHP}{\partial CVG} & \frac{\partial SHP}{\partial PP} \\ \frac{\partial P_b}{\partial w_f} & \frac{\partial P_b}{\partial CVG} & \frac{\partial P_b}{\partial PP} \\ \vdots & \vdots & \vdots \end{bmatrix}$$

Each of the above matrices include terms that are linear relationships, and in particular terms that are shown as partial derivatives. Each of the terms can be determined at a given point in an operational envelope such that each A, B, C, and D matrix is a representation of that point. Likewise, each value of the state vector X, control vector U, and output vector Y can be determined at the same point. If a broad range of conditions in the operational envelope are desired, multiple matrices and vectors can be constructed across a number of points in the envelope to produce a set of matrices and a set of vectors representing an engine model as a function of a chosen variable or variables. For example, a set of A matrices, B matrices, C matrices, and D matrices can be generated that represent different linear models at separate operational conditions. To set forth one non-limiting embodiment, the set of matrices can be determined at a fixed altitude and airspeed, such as for example 25,000 feet and 0.83 Mach number, but with a variable engine condition. Other flight conditions can be used as well, such as 25,000 feet and 0.6 Mach number. Such a variable engine condition can be a pressure or temperature of the engine, such as but not limited to a burner pressure. Thus, in one form the set of matrices can be determined as a function of burner pressure at a constant altitude and airspeed. The state variable model, therefore, could be represented as follows, where the subscript 'nom' represents a model at a nominal fixed altitude and airspeed at each of the various burner pressure ($P_b$) conditions:

$$A_{nom}(P_b), B_{nom}(P_b), C_{nom}(P_b), D_{nom}(P_b)$$

Figure 4:
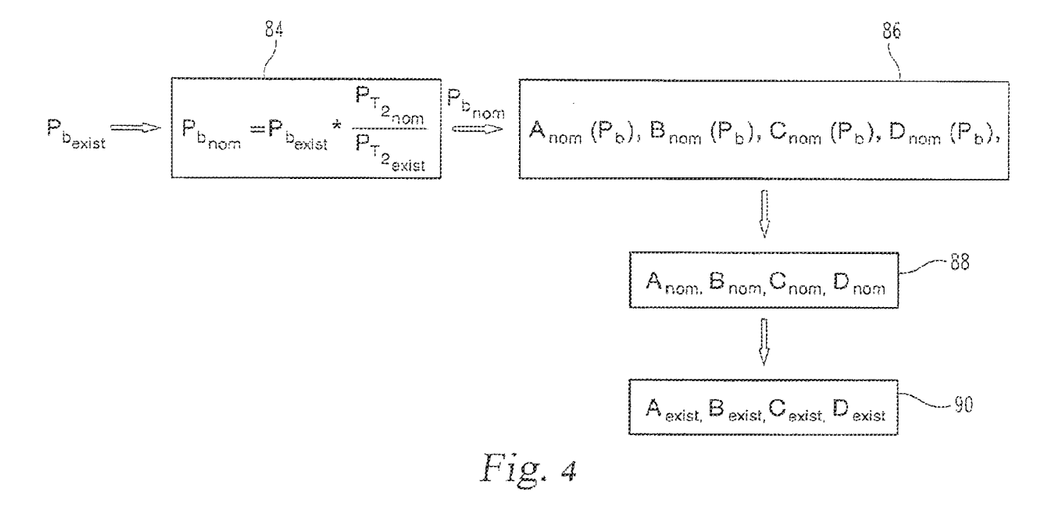
FIG. 4 depicts an embodiment of adjusting an engine model.

Similar notation can be assigned to the set of state vectors X, control vectors U, and output vector Y. Given that an engine may not be operated at the exact altitude and airspeed in which the state matrices, state vector, control vector, and output vector were determined to form the piece-wise linear state space model, a correction can be applied to adjust values of each of the matrices and vectors to the appropriate altitude and airspeed. FIG. 4 represents one method of determining an equivalent A, B, C, and D matrix at current operating condition, and similar approach can be described for the X, U, and Y vectors. Current burner pressure can be measured, synthesized, or calculated and can be represented as $P_{b_{exist}}$ where 'exist' represents the existing condition. The current burner pressure is then used in a relationship that equates the ratio of a nominal $T_2$ temperature to an existing $T_2$, to that of a ratio of nominal burner pressure to existing burner pressure to solve for a nominal burner pressure as shown in reference numeral 84. The nominal burner pressure can then be used in the piece-wise linear set of state space matrices shown at reference numeral 86. As will be recalled from the discussion above, the set of state space matrices $A_{nom}(P_b)$, $B_{nom}(P_b)$, $C_{nom}(P_b)$, $D_{nom}(P_b)$ were determined across a range of burner pressure. Given the value of burner pressure as determined by reference numeral 88, the matrices can be examined via any variety of techniques such as interpolation or extrapolation to find a nominal set of A, B, C, and D matrices that correspond to the nominal burner pressure, represented at reference numeral 84. This nominal set of matrices $A_{nom}$, $B_{nom}$, $C_{nom}$, $D_{nom}$ can then be operated upon to adjust from the nominal conditions to the actual operating condition, denoted as above using the subscript 'exist' and shown at reference numeral 90. The process to adjust the values in the nominal set of matrices is described as follows below.

The individual terms of the $A_{nom}$, $B_{nom}$, $C_{nom}$, $D_{nom}$ matrices can be adjusted to the current, or existing, operating condition using relationships that can be particular to the linear relationship each of the terms represent. For example, the term in the A matrix represented in the first row, first column location above is $$\frac{\partial \dot{N}_1}{\partial N_1}$$

and the discussion that follows is a procedure for correcting that term from the nominal value to the existing value. Though the following description is limited to the first row and first column term of the above arranged A matrix, other relationship can be used to adjust each of the remaining elements of the A, B, C, and D matrices such that a set of matrices are adjusted to the current, or existing, operating conditions.

To begin adjusting the term $$\frac{\partial \dot{N}_1}{\partial N_1}$$

first start by stating a known relationship between torque and a ratio of pressures as follows:

$$\left.\frac{\tau}{\delta_2}\right)_{EXIST} = \left.\frac{\tau}{\delta_2}\right)_{NOM}$$

where $$\delta_2 = \frac{P_{T_2}}{P_{T_2,SLS}}$$

The expression can be rearranged as follows:

$$\tau_{EXIST} = \left.\frac{\tau}{\delta_2}\right)_{NOM} \cdot \delta_{2_{EXIST}}$$

Since $\tau$ is proportional to $\dot{N}$, the expression can be rewritten as follows:

$$\dot{N}_{EXIST} = \dot{N}_{NOM} \cdot \frac{\delta_{2_{EXIST}}}{\delta_{2_{NOM}}}$$

Using two other known relationships:

$$\theta_2 = \frac{T_{T_2}}{T_{T_2,SLS}}$$

and $$\left.\frac{N}{\sqrt{\theta_2}}\right)_{EXIST} = \left.\frac{N}{\sqrt{\theta_2}}\right)_{NOM}$$

the expression for N can be rewritten as follows:

$$N_{EXIST} = N_{NOM} \cdot \frac{\sqrt{\theta_2}_{EXIST}}{\sqrt{\theta_2}_{NOM}}$$

Thus, combining the relationships expressed above for both N and for $\dot{N}$ yields the following which can be used to adjust a nominal value of the linear relationship $$\frac{\partial \dot{N}_1}{\partial N_1}$$

to the current, or existing, operating condition as shown as follows:

$$\left.\frac{\partial \dot{N}}{\partial N}\right)_{EXIST} = \left.\frac{\Delta \dot{N}}{\Delta N}\right)_{NOM} = \left.\frac{\partial \dot{N}}{\partial N}\right)_{NOM} \cdot \frac{\delta_{2_{EXIST}}}{\delta_{2_{NOM}}} \cdot \frac{\sqrt{\theta_{2_{EXIST}}}}{\sqrt{\theta_{2_{NOM}}}}$$

This or a similar processes can be repeated to provide existing values for each of the state space matrices to yield the existing matrices as depicted in reference numeral 86.

Figure 5:
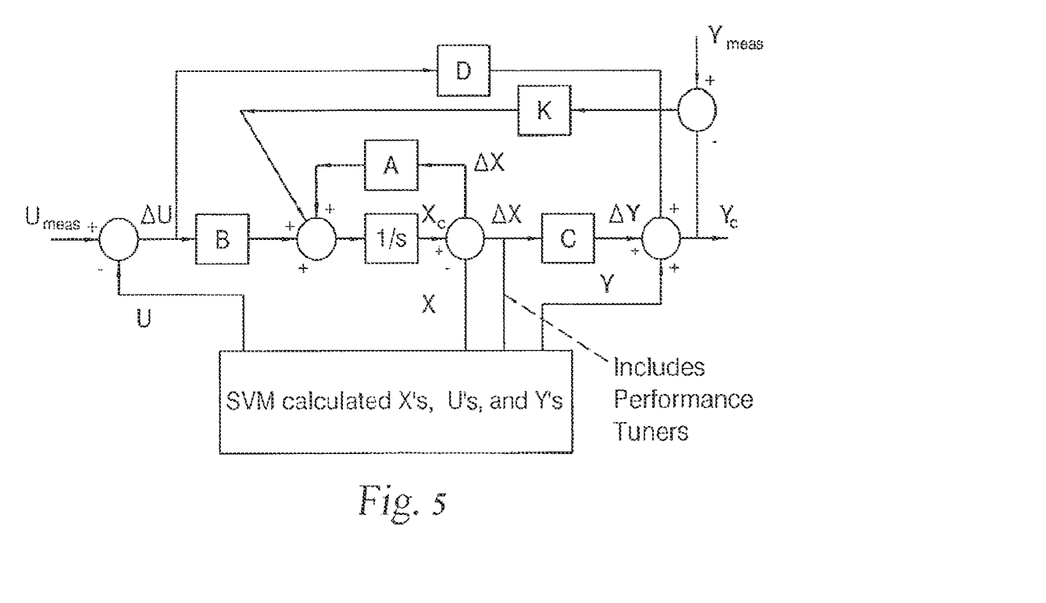
FIG. 5 depicts an embodiment of an observer.

After the existing model has been determined as above, the matrices and vectors are coupled with an observer 76 to further account for actual operating model of the engine 52. Turning now to FIG. 5 and with continuing reference to FIG. 3, the observer 76 is configured to receive the state matrices and vectors, as well as receive measured values of the control and output vectors, and to thereafter generate performance tuners to update the model to actual conditions. The observer model depicted in FIG. 5 can be represented according to the following relationship:

$$\Delta \dot{X} = A \cdot \Delta X + B \cdot \Delta U + k \cdot e$$

$$\Delta Y = C \cdot \Delta X + D \cdot \Delta U$$

$$e = Y_{meas} - Y_c$$

Where $Y_{meas}$ is measured output, $Y_c$ is a corrected output determined by summing the model derived output with a delta output computed by the observer, and k is a gain that can have a constant value, but in some forms can also be scheduled as a function of any variable, such as flight condition, engine condition, etc. It will be appreciated in the relationships herein that k is a gain matrix and e a vector. Thus, it will be appreciated that k can be a gain matrix that can be constant.

The observer 76 interacts with the piece-wise linear state-space model 82 by sending performance tuners such as a change in state vector and receiving residuals representing a difference between the actual outputs of the engine 52 and model outputs. The observer 76 works to provide a real-time estimate of a model representative of actual conditions for use in the engine predictor model 76.

The engine predictor model 76 is a special case of the observer model set forth above wherein the dynamic state of the observer is set to zero and the algebraic representation of the observer is solved for outputs as a function of inputs. If, for purposes of determining a representative model that can be integrated with an optimization routine, the dynamic state $\Delta \dot{X}$ of the observer model is set to zero, the algebraic representation of the observer set forth above can be solved and rearranged as follows:

$$\Delta X = -A^{-1}(B \cdot \Delta U + k \cdot e)$$

$$\Delta Y = (D - C \cdot A^{-1} \cdot B)\Delta U - C \cdot A^{-1} \cdot k \cdot e$$

In this special case, and as will be explained further below regarding the optimization module 80, the term $\Delta U$ is not a difference between an actual control vector and a model control vector. Rather, the term $\Delta U$ will represent a perturbed control vector as a result of the optimization module 80 to assist in estimating and finding an output.

The equations above representing the engine predictor model 76 can be further coupled with other models, as shown in the illustrated embodiment of FIG. 3, to form a model system which can then be interrogated by the optimization module 80. These models that can be coupled with the engine predictor model 76 can take on a variety of forms. In the illustrated embodiment two separate models are shown as coupled with the engine predictor model 76, but in other embodiment fewer or greater numbers of models can be used. In the illustrated embodiment a propeller model 92 and installation aero model 94 are used to assist the optimization module 80 in determining an appropriate propeller setting, among other possible control settings.

During operation of the optimization module 80, a control vector perturbation δu is issued to determine an change in output from the engine predictor model 78 and other associated models, such as model 92 and 94 in the illustrated embodiment. The control vector perturbation can be used with or as the $\Delta U$ discussed immediately above. The optimization module 80 can have an objective function and/or include constraints such that either the control perturbation or the change in outputs returned from the control perturbation are bounded. Such constrained optimization can be useful to arrive at a suitable optimized change in control vector to be used with the baseline controller 70. Once the optimization module 80 arrives at a suitable change in control vector, it passes the delta δu along to the baseline controller 70 for incorporation prior to a command signal being issued to a mechanism that operates upon the command, such as a propeller pitch, compressor variable vane, or fuel flow, to set forth just a few non-limiting examples. While it will be understood that a mechanism will generally have a device capable of receiving either an analog or digital command and operate accordingly, no limitation is intended regarding the interactions, mechanical, electrical, or otherwise, between the command signal and the mechanism.

The delta δu can be incorporated with the command signal in a number of ways. For instance, the delta can be summed with the command signal from the baseline controller 70 just prior to the total command being issued to the mechanism. In some forms of multi-channel controllers, the delta can be summed with a command from the baseline controller prior to fault tolerance and redundancy checks.

In one form the controller can be used during operation of the gas turbine engine. For example, in one non-limiting embodiment the controller operates in real-time to not only determine engine performance and provide a predictor model for optimization, but also to generate control offsets for use with the legacy engine controller during the same duty cycle of the gas turbine engine. Other variations are contemplated herein.

In another form the computed deltas of efficiencies and flow capacities can be compared to certain thresholds, and if some of those deltas exceed the respective thresholds degraded engine condition can be declared, and fail mode control actions can be initiated to ensure 'get home capability'.

One aspect of the present application provides an apparatus comprising an aircraft gas turbine engine controller having a baseline controller structured to generate a command to affect an operation of an engine, the controller also having a delta controller operable to generate an offset command to be summed with the command generated by the baseline controller, the delta controller having a module structured to determine a model of engine performance and an optimization routine that together determine the offset command, wherein an objective function of the optimization routine is derived from an output relationship of an observer in which the states of the output relationship are resolved by assuming the dynamic states in the observer to be in steady state.

A feature of the present application provides wherein the observer is structured to operate upon a sensitivity relationship determined on the basis of a set of sensitivity relations defined at a flight condition and arranged as a function of a gas turbine engine pressure, the sensitivity relationship determined by: correcting a first condition pressure to a reference pressure, evaluating the set of sensitivity relations based upon the reference pressure to produce a reference sensitivity relation, adjusting the reference sensitivity relation to a first condition sensitivity relation to create the model of engine performance.

Another feature of the present application provides wherein the set of sensitivity relations is a piece-wise linear state variable model, and wherein the observer is a Kalman filter, and wherein the aircraft gas turbine engine controller is capable of generating a plurality of commands and a plurality of offset commands.

Still another feature of the present application provides wherein the Kalman filter is structured to compute deltas on efficiencies and flow capacities of the model of engine performance, and wherein the delta controller also includes a function to incorporate propeller performance and installation aerodynamics Yet still another feature of the present application provides wherein the aircraft gas turbine engine controller is in communication with an aircraft gas turbine engine, wherein the aircraft gas turbine engine is coupled with an aircraft to provide propulsive power, and wherein the aircraft engine controller is structured to generate offsets during operation of the aircraft.

Skill yet another feature of the present application further includes an aircraft that includes a bladed rotor coupled with the aircraft gas turbine engine, wherein the aircraft gas turbine engine controller is in electrical communication with a device to change an operation of the aircraft, and wherein the bladed rotor is external of the gas turbine engine.

A further feature of the present application provides wherein the bladed rotor is a propeller such that the aircraft is a turboprop, and wherein the command is one of propeller speed, compressor variable geometry, and fuel flow.

Another aspect of the present application provides an apparatus comprising an aircraft engine, a multi-condition envelope controller structured to generate an engine command for the aircraft engine at an operating flight condition including an optimizer used to determine the engine command, the controller capable of: developing an operating condition engine model based upon the operating flight condition, and determining a command value for the engine command from an objective function, the objective function a representation of an output vector of a Kalman filter using the operating condition engine model and in which a state vector used in the representation of the output vector is resolved by setting the dynamic state vector in the observer model to zero.

A feature of the present application provides wherein the multi-condition envelope controller includes a set of baseline engine models arranged as a function of an engine condition at a reference flight condition, wherein the developing includes interrogating the baseline engine models based upon an engine condition at the operating flight condition corrected to a reference engine condition, the interrogation of the baseline engine models structured to create a reference engine model, and which further includes correcting the reference engine model to the operating flight condition to create an operating condition engine model.

Another feature of the present application provides wherein the interrogating is in the form of an interpolation, and wherein the correcting the reference engine model is accomplished using partial derivative corrections.

Still another feature of the present application provides wherein the objective function is in the form:

$$\Delta Y = (D - C \cdot A^- \cdot B) \Delta U - C \cdot A^{-1} \cdot k \cdot e$$

where $\Delta U$ is a variable of the optimization, the matrices A, B, C, and D represent model, k represents a gain matrix, and e is an error vector between a measured output and a calculated output.

Yet still another feature of the present application provides wherein the controller further includes a model of engine/airframe performance which is used in the determination of the command value.

Still yet another feature of the present application provides wherein the aircraft engine is structured to drive a variable pitch propeller, the engine command used to change a pitch of the variable pitch.

A further feature of the present application provides wherein the engine command is a composite of the command value and a command generated from a baseline controller.

Yet another feature of the present application provides wherein the aircraft engine is a gas turbine engine integrated with an aircraft, the command value capable of changing one of a fuel flow, compressor variable geometry, and propeller pitch.

Still another aspect of the present application provides a method comprising operating a gas turbine engine to produce power, developing an engine command useful in controlling an operation of the gas turbine engine, optimizing an offset to the engine command through an evaluation of an output of a state-space system model, wherein a state vector useful in the output is resolved by evaluating the state-space system model at steady state condition, and wherein an input to the state-space system model is assessed as a result of the optimizing to satisfy an objective, and manipulating a device based upon the engine command and the offset to change performance of the gas turbine engine.

A feature of the present application provides wherein the gas turbine engine is coupled with an aircraft having a bladed air moving device, wherein the optimization further includes resolving an updated model of the aircraft engine, and which further includes constraining the offset with a limit.

Another feature of the present application further includes formulating a real-time model estimate of engine operation.

Still another feature of the present application provides wherein the formulating includes: determining a reference pressure based upon a relationship between a ratio of engine conditions at an operating state and a ratio of reference engine conditions, interpolating a set of engine models based upon the reference pressure to produce a reference engine model, and correcting the reference engine model to produce an engine model representative of the operating state.

Yet still another feature of the present application provides wherein correcting includes multiplying a plurality of elements of a state-space model using a plurality of correction factors, and which further includes an aircraft having the gas turbine engine.

Still yet another feature of the present application provides wherein the offset is derived from, the relationship:

$$\Delta Y = (D - C \cdot A^{-1} \cdot B) \Delta U - C \cdot A^{-1} \cdot k \cdot e$$

where $\Delta U$ is allowed to vary as a result of the optimization, the matrices A, B, C, and D are determined using a real-time model estimator, k represents again matrix, and e is an error vector between a measured output and a calculated output.

A further feature of the present application provides wherein the optimization further includes accounting for installation aerodynamic effects and a propeller operation of an aircraft having the gas turbine engine, and wherein at least one of a computed delta of efficiency and a computed flow capacity is compared to a threshold to test whether a degraded engine condition is declared and a fail mode control action is initiated.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   an aircraft gas turbine engine controller comprising:
   a baseline controller structured to generate a command to affect an operation of an engine,
   a delta controller operable to generate an offset command to be summed with the command generated by the baseline controller, the delta controller comprising:
   a module structured to determine a model of engine performance; and
   an optimization routine that together determine the offset command,
   wherein an objective function of the optimization routine is derived from an output relationship of an observer in which the states of the output relationship are resolved by assuming the dynamic states in the observer to be in steady state, and
   wherein the observer is structured to operate upon a sensitivity relationship determined on the basis of a set of sensitivity relations defined at a flight condition and arranged as a function of a gas turbine engine pressure, the sensitivity relationship determined by:
   correcting a first condition pressure to a reference pressure;
   evaluating the set of sensitivity relations based upon the reference pressure to produce a reference sensitivity relation; and
   adjusting the reference sensitivity relation to a first condition sensitivity relation to create the model of engine performance.

2. The apparatus of claim 1, wherein the set of sensitivity relations is a piece-wise linear state variable model, wherein the observer is a Kalman filter, and wherein the aircraft gas turbine engine controller is capable of generating a plurality of commands and a plurality of offset commands.

3. The apparatus of claim 2, wherein the Kalman filter is structured to compute deltas on efficiencies and flow capacities of the model of engine performance, and wherein the delta controller also includes a function to incorporate propeller performance and installation aerodynamics.

4. The apparatus of claim 1, wherein the aircraft gas turbine engine controller is in communication with an aircraft gas turbine engine, wherein the aircraft gas turbine engine is coupled with an aircraft to provide propulsive power, and wherein the aircraft engine controller is structured to generate offsets during operation of the aircraft.

5. The apparatus of claim 4, further comprising the aircraft that includes a bladed rotor coupled with the aircraft gas turbine engine, wherein the aircraft gas turbine engine controller is in electrical communication with a device to change an operation of the aircraft, and wherein the bladed rotor is external of the gas turbine engine.

6. The apparatus of claim 5, wherein the bladed rotor is a propeller such that the aircraft is a turboprop, and wherein the command is one of propeller speed, compressor variable geometry, and fuel flow.

7. An apparatus comprising:
an aircraft engine;
a multi-condition envelope controller structured to generate an engine command for the aircraft engine at an operating flight condition including an optimizer used to determine the engine command, the controller configured to:
develop an operating condition engine model based upon the operating flight condition; and
determine a command value for the engine command from an objective function, the objective function a representation of an output vector of a Kalman filter using the operating condition engine model and in which a state vector used in the representation of the output vector is resolved by setting the dynamic state vector in the observer model to zero, and
wherein the objective function is in the form:

$$\Delta Y = (D - C \cdot A^{-1} \cdot B) \Delta U - C \cdot A^{-1} \cdot k \cdot e$$

where $\Delta U$ is a variable of the optimization, the matrices A, B, C, and D represent a model, k represents a gain matrix, and e is an error vector between a measured output and a calculated output.

8. The apparatus of claim 7, wherein the multi-condition envelope controller includes a set of baseline engine models arranged as a function of an engine condition at a reference flight condition;
wherein the multi-condition envelope controller is configured to develop the operations condition engine model by at least interrogating the baseline engine models based upon an engine condition at the operating flight condition corrected to a reference engine condition, the interrogation of the baseline engine models structured to create a reference engine model; and
wherein the multi-condition envelope controller is configured to correct the reference engine model to the operating flight condition to create an operating condition engine model.

9. The apparatus of claim 8, wherein the interrogating is in the form of an interpolation, and wherein the multi-condition envelope controller is configured to correct the reference engine model using partial derivative corrections.

10. The apparatus of claim 7, wherein the multi-condition envelope controller further includes a model of engine and airframe performance, and wherein the multi-condition envelope controller is configured to use the model of engine and airframe performance to determine the command value.

11. The apparatus of claim 10, wherein the aircraft engine is structured to drive a variable pitch propeller, and wherein the multi-condition envelope controller is configured to use the engine command to change a pitch of the variable pitch.

12. The apparatus of claim 10, wherein the engine command is a composite of the command value and a command generated from a baseline controller.

13. The apparatus of claim 12, wherein the aircraft engine is a gas turbine engine integrated with an aircraft, and wherein the command value is configured to change at least one of a fuel flow, compressor variable geometry, and propeller pitch.

14. A method comprising:
operating a gas turbine engine to produce power;
developing an engine command useful in controlling an operation of the gas turbine engine;
optimizing an offset to the engine command through an evaluation of an output of a state-space system model, wherein a state vector useful in the output is resolved by evaluating the state-space system model at steady state condition, and wherein an input to the state-space system model is assessed as a result of the optimizing to satisfy an objective;
manipulating a device based upon the engine command and the offset to change performance of the gas turbine engine; and
formulating a real-time model estimate of engine operation, wherein formulating the real-time model estimate includes:
determining a reference pressure based upon a relationship between a ratio of engine conditions at an operating state and a ratio of reference engine conditions;
interpolating a set of engine models based upon the reference pressure to produce a reference engine model; and
correcting the reference engine model to produce an engine model representative of the operating state.

15. The method of claim 14, wherein the gas turbine engine is coupled with an aircraft comprising a bladed air moving device, wherein optimizing an offset further includes resolving an updated model of the aircraft engine, and which further includes constraining the offset with a limit.

16. The method of claim 14, wherein correcting the reference engine model includes multiplying a plurality of elements of a state-space model using a plurality of correction factors, which further includes an aircraft comprising the gas turbine engine; wherein the offset is derived from, the relationship:

$$\Delta Y = (D - C \cdot A^{-1} \cdot B) \Delta U - C \cdot A^{-1} \cdot k \cdot e$$

where $\Delta U$ is allowed to vary as a result of the optimization, the matrices A, B, C, and D are determined using a real-time model estimator, k represents a gain matrix, and is an error vector between a measured output and a calculated output; wherein the optimization further includes accounting for installation aerodynamic effects and a propeller operation of the aircraft comprising the gas turbine engine, and wherein at least one of a computed delta of efficiency and a computed flow capacity is compared to a threshold to test whether a degraded engine condition is declared and a fail mode control action is initiated.

* * * * *

UNITED STATES PATENT AND TRADEMARK OFFICE
CERTIFICATE OF CORRECTION

| | |
|---|---|
| PATENT NO. | : 9,759,132 B2 |
| APPLICATION NO. | : 14/460534 |
| DATED | : September 12, 2017 |
| INVENTOR(S) | : Syed Jalaluddin Khalid |

Page 1 of 1

It is certified that error appears in the above-identified patent and that said Letters Patent is hereby corrected as shown below:

In the Claims

Column 14, Line 46 (Claim 16): "and is an error vector" should read --and e is an error vector--

Signed and Sealed this
Tenth Day of April, 2018

Andrei Iancu
*Director of the United States Patent and Trademark Office*